April 3, 1956 L. H. KNOST 2,740,451
OFFSET FLANGING MACHINE
Filed May 16, 1950 2 Sheets-Sheet 2
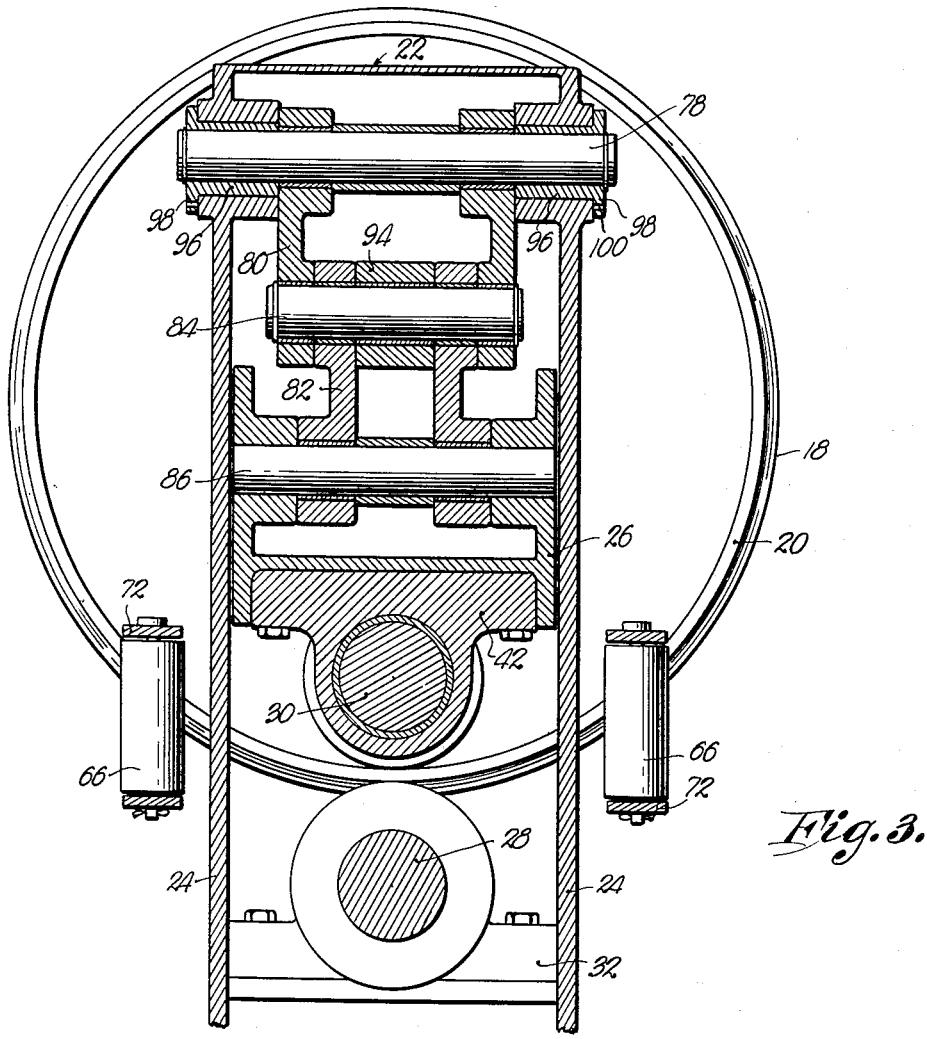
Fig. 3.
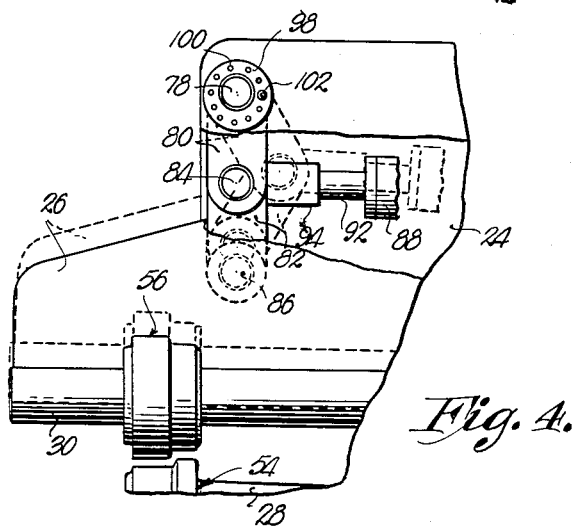
Fig. 4.
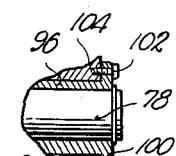
Fig. 5.
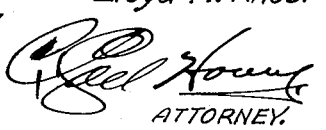
INVENTOR.
Lloyd H. Knost
BY
ATTORNEY.

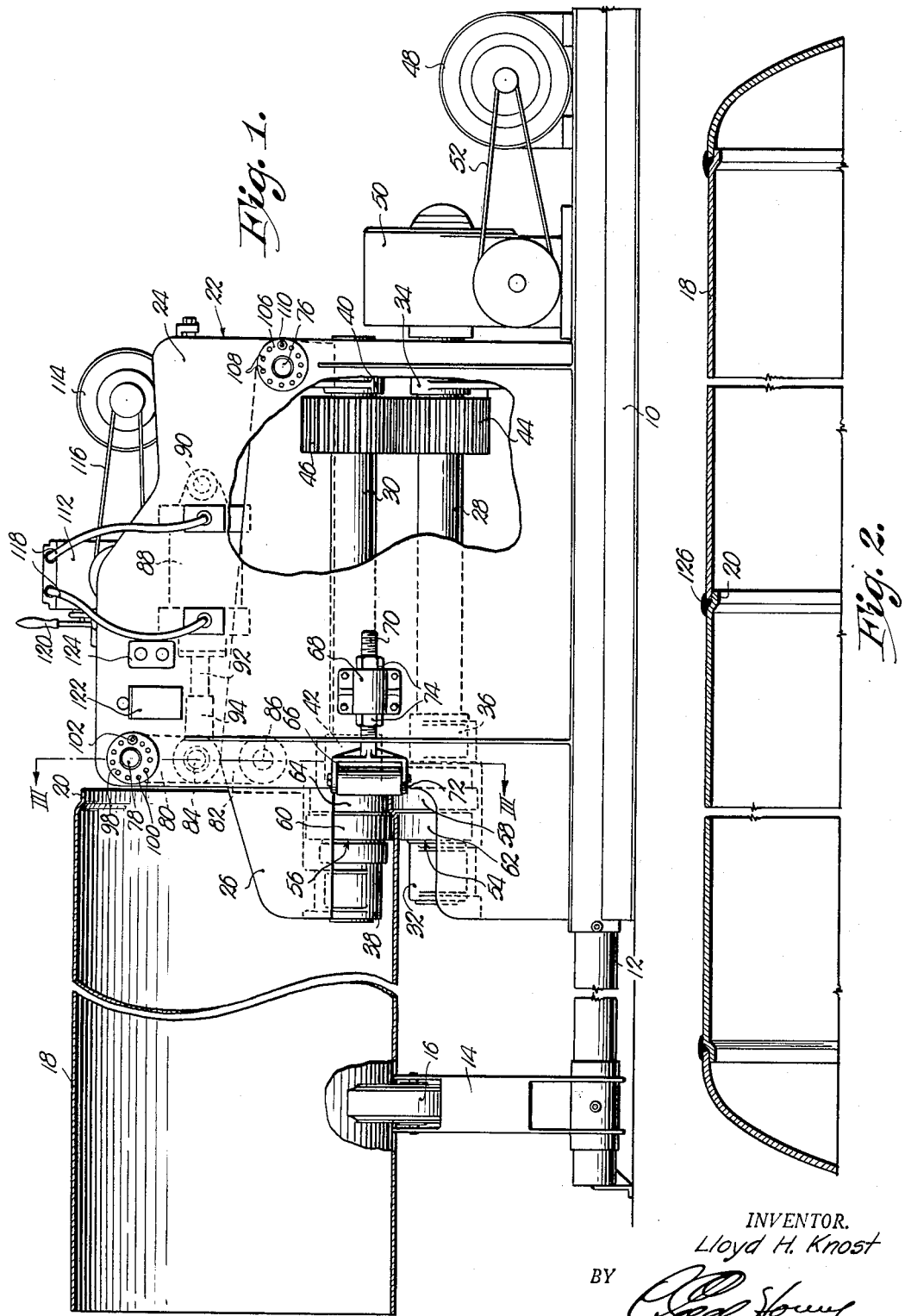

United States Patent Office 2,740,451
Patented Apr. 3, 1956

2,740,451

OFFSET FLANGING MACHINE

Lloyd H. Knost, Carthage, Mo.

Application May 16, 1950, Serial No. 162,191

11 Claims (Cl. 153—29)

This invention relates to material handling equipment and particularly to a device for forming an offset flange such as in cases of cylindrical pipes, conduits and the like of various diameters, whereby to present an interlocking joint between the adjacent ends of the pipe sections and adaptable primarily to "back-up" a welded seam for rigidly interconnecting such sections.

Primarily, it is the object of this invention to provide a machine capable of quickly and easily providing an offset toggle joint to be used in interconnecting cylindrical tanks, conduits, pipes and the like, and thereby providing a back-up for subsequent manual or automatic welding operation of the presented seam.

Heretofore, cylindrical shells and the like have been butted together at adjacent ends to present a square joint. Before the automatic welding step could take place, it was necessary to manually weld one or more passes on the inner face of the work at the joint to provide a suitable back-up for the automatic weld. In lieu of this method, chill rings or back-up bars have been utilized constituting merely a ruled ring that is tack-welded under the circumferential seam to make ready for the automatic welding step.

It is one important object of the present invention therefore, to provide a machine that is capable of eliminating the aforesaid common steps in interconnecting cylindrical objects by forming an offset flange on one end of each pipe or shell section, which flange is capable of serving as a back-up bar or bead for the automatic welding operation.

An important object of the present invention is to provide a machine of the aforesaid character having a pair of opposed forming rollers capable of producing the offset flange and movable toward and away from each other whereby the extent of offset may be varied to suit the desires of the operator, and further, whereby cylinders, pipes and the like made from materials of various thicknesses, may be accommodated.

A further object of the present invention is to provide a machine as above set forth and including secondary adjusting means that may be pre-set by the operator in accordance with the thickness of the material being handled and according to the contour or design of the flange to be formed.

A still further object of the present invention is to provide an offset flanger having thrust rollers for contacting one end of the work being flanged, whereby to limit inward movement of the work into the forming rollers and to thus predetermine the width of the flange to be formed upon the end of the work piece.

Further objects of the present invention include the way in which the offset flange hereof is provided with eccentric bushing assemblies that are individually rotatable to selected positions for varying the distance between the forming rollers; the way in which toggle mechanism is provided for swinging a frame support for one of the rollers, thereby moving the latter toward and from a stationary roller; the manner of operably interconnecting the rollers for simultaneous rotation irrespective of the position of the movable frame of the assembly; and certain other objects, all of which will be made clear or become apparent in the following specification, reference being had to the accompanying drawings, wherein:

Figure 1 is a side elevational view of an offset flanging machine made in accordance with the present invention, parts being broken away to reveal details of construction.

Fig. 2 is a fragmentary, longitudinal, sectional view through several pipe sections finally interconnected after formation of an offset flange thereon through use of the machine hereof.

Fig. 3 is an enlarged, fragmentary, vertical, cross-sectional view taken on line III—III of Fig. 1 and looking in the direction of the arrows.

Fig. 4 is a fragmentary, schematic, side elevational view of the toggle mechanism per se; and Fig. 5 is a fragmentary, detailed, cross-sectional view to illustrate certain further details of construction of an adjustable eccentric shaft mounting utilized in the machine of the present invention.

A main supporting framework for the machine about to be described, is illustrated in Fig. 1 of the drawing and broadly designated by the numeral 10. Framework 10 carries at one end thereof an elongated base 12 and may be rendered extensible with respect to the framework 10 if desired.

Base 12 carries a work-support that includes a pair of coacting standards, one only of which is shown in Fig. 1 and designated by the numeral 14. Any number of such work-supports may be provided as desired and arranged for movement longitudinally along base 12 for standard adjustment. Each stand 14 carries an idler wheel 16 that rotates on a horizontal axis and directly underlies a cylinder 18 upon which an offset flange 20 is to be formed through use of the machine hereof.

A hollow housing, broadly designated by the numeral 22, carried by framework 10, serves not only as a supporting stationary framework for one of the forming rollers hereinafter referred to, but encases substantially all of the component parts of the machine.

Housing 22 includes a pair of spaced-apart, substantially parallel side walls 24 and serves additionally as a support for an elongated, movable frame 26. A pair of elongated, substantially horizontal shafts 28 and 30, disposed within the housing 22 are rotatably carried by housing 22 and frame 26 respectively.

A pair of opposed bearings 32 and 34 and an intermediate bearing 36, all carried by the housing 22 between walls 24, rotatably support the shaft 28. Similarly, a pair of opposed bearings 38 and 40 and an intermediate bearing 42, depend from, and are supported solely by the frame 26 for movement with the latter separate from the housing 22 and between walls 24. These bearings 38 and 40 rotatably support the uppermost shaft 30. Intermeshing gears 44 and 46 on shafts 28 and 30 respectively, adjacent bearings 34 and 40, insure simultaneous rotation of shafts 28 and 30 upon operation of a suitable prime mover 48 carried by framework 10. A gear box 50, housing a gear reducer, not shown, is coupled directly with shaft 28 and is driven by prime mover 48 through a belt, chain or the like 52.

A pair of forming rollers 54 and 56 are carried by shafts 28 and 30 respectively near that end thereof opposite to gears 44 and 46. It is noted that roller 54 is disposed between bearings 32 and 36 and that roller 56 is between bearings 38 and 42. Rollers 54 and 56 are provided with staggered circular forming dies 58 and 60 respectively. A portion 62 on roller 54 directly underlies die 60 and a portion 64 on roller 56 directly overlies die 58.

A pair of spaced rollers 66, each mounted for free rotation on a vertical axis, serve as thrust members for the end of cylinder 18 adjacent the working end of the machine and the rollers 66 are mounted upon opposite sides of the housing 22 through the medium of a bracket 68 (see Fig. 1) secured directly to the side wall 24 of the housing 22. Each bracket 68 carries a horizontal screw 70 having a yoke 72 that rotatably supports its associated roller 66.

Adjustment of the rollers 66 longitudinally of the machine is provided by means of opposed nuts 74 on screw 70. Further bodily adjustment of the rollers about their respective supporting screw axes is also possible if so desired under certain conditions of operation.

It is noted in Fig. 1 of the drawings that the frame 26 is of an elongated nature and extends outwardly beyond one end of the housing 22 and into the cylinder 18 when the latter is operably positioned as shown in Figs. 1 and 3. It is notable also that the width of the frame 26 is such as to substantially span the distance between the innermost faces of walls 24 (Fig. 3). One end of the frame 26 is mounted for free swinging movement on a horizontal axis directly above bearing 40 through the medium of a transverse shaft 76 interconnecting walls 24. The opposite end of the frame 26 is supported by a second horizontal shaft 78 directly above bearing 42 and likewise interconnecting walls 24 at a higher elevation than the shaft 76.

A pair of toggle links 80 and 82 are pivotally interconnected by horizontal pin 84, the uppermost link 80 being swingable on the shaft 78. A horizontal pin 86 substantially parallel with shaft 78 and pin 84 and immediately below the latter, pivotally joins the link 82 with frame 26.

A hydraulic cylinder 88 within housing 22 is swingably secured to the latter for movement on a horizontal axis by a pin 90. Cylinder 88 has a piston 92 that is coupled with a clevis 94 that is in turn pivotally secured to the pin 84.

The shaft 78 is eccentrically disposed within a pair of identical bushings 96 rotatably carried by walls 24 and each having an out-turned flange 98 provided with a series of openings 100. Bushings 96 are held in predetermined positons through the medium of a pin or screw 102, passing through a selected opening 100 and into a cavity 104 formed in the proximal wall 24 of housing 22.

The shaft 76 is eccentrically mounted in the same manner through the medium of bushings rotatably mounted in walls 24, one only of which is shown in Fig. 1 and designated by the numeral 106. The two opposed bushings 106 are likewise provided with an annular series of openings 108 and a pin 110 for holding the same in a predetermined position. If desired, suitable calibrations (not shown) may be provided on the outermost faces of walls 24 adjacent the four bushings 96—96 and 106—106 for indicating the position of frame 26 and its shaft 30 with respect to shaft 28. Likewise, a suitable indicator including calibrations on housing 22 (not shown) may be provided for indicating the position of the toggle mechanism above described and including links 80 and 82 which will also indicate to the operator the swinging position of frame 26 on its axis 76.

An hydraulic pump 112 carried by housing 22 and driven by a prime mover 114 through belt 116, supplies pressurized fluid for cylinder 88 through hoses 118. Lever 120 controls the flow of fluid to cylinder 88 and therefore, swinging movement of frame 26. A pair of electric switch assemblies 122 and 124 is provided on housing 22 for controlling prime movers 48 and 114 respectively.

In operation, the cylinder 18 to be flanged, is placed upon the supporting idler wheels 16 and the open end of the cylinder is positioned between the rollers 54 and 56 while frame 26 is swung to a raised position on axis 76 by retraction of piston 92 within cylinder 88. The screws 70 are adjusted to determine the width of the offset flange 20 and accordingly, rollers 66 serve to resist inward pull or thrust of the shell or cylinder 18 during the forming operation.

With the cylinder 18 properly positioned, the operator, through actuation of control lever 120, energizes the hydraulic cylinder 88 to move toggle links 80 and 82 from the dotted line position shown in Fig. 4 of the drawing to the full line position shown in said figure. This causes the frame 26 to swing downwardly on axis 76 and brings the roller 56 into engagement with the internal peripheral face of the cylinder 18. The force applied depends upon the extent of movement of piston 92 and accordingly, the depth of the offset flange 20 is determined thereby. Simultaneously, the rollers 54 and 56 are caused to rotate by energization of prime mover 48 which drives shaft 28 and through gears 44 and 46 imparting opposite rotative movement to shaft 30.

In the event that work made from material having a thickness differing from that illustrated in Fig. 1 of the drawings, is to be flanged, the operator can vary the distance between shafts 28 and 30 by merely rotating the eccentric bushings 96 and/or 106 and resetting the pins 102 and 110 with respect to openings 100 or 108 as the case may be.

It is seen in Fig. 2 that an offset flange 20 may be formed on either or both ends of cylindrical members and that when such members are brought into relative telescoping interlocking engagement an underlying bead is provided for the annular weld 126 that interconects the cylinder or pipe sections.

It seems important to reiterate the primary features of the inventions which include the way in which cylinders or shells having differing thicknesses of material may be accommodated; the way in which virtually any size conduit can be flanged through use of the machine; the manner of varying the width of the flange; and the way in which the extent of offset can be predetermined irrespective of the nature of the work being handled.

Many additional advantages will become clear to those skilled in this field and therefore, it is desired to be limited only by the spirit of the invention as defined by the scope of the appended claims.

Having thus described the invention, what is claimed as new and desired to be secured by Letters Patent is:

1. A machine for deforming a peripheral portion of a tubular work piece comprising coacting pivotally connected fixed and movable frames, forming rolls supported by each frame, said rolls being arranged to engage opposite surface portions of the wall of said work piece, and operative mechanism carried by said fixed frame and connected to support and to actuate the movable end of the associated movable frame whereby to bodily manipulate the associated forming roll toward and away from the other of said forming rolls, said operative mechanism comprising toggle mechanism having a plurality of shafts connecting articulate links having their opposite outward terminal end portions connected with said frames respectively to bodily suspend and locate the roll carrying end of said movable frame and selectively adjustable eccentric bearing means carried by one of said frames to coact with one of said toggle shafts to predetermine the maximum distance of approach of the forming rolls supported by said respective frames and through the operation of said toggle, and power means joined with said links to straighten and break the toggle formed by said links to dispose the suspended end of the movable frame in variable operative and inoperative positions with respect to said other roll.

2. A machine for deforming a peripheral portion of a tubular work piece comprising a base, a housing on said base, a movable frame carried by said housing, work forming rolls connected with said housing and movable frame, and operable mechanism interconnected between said housing and frame to suspend the movable frame from said housing and whereby to actuate the frame and its frame roll toward and away from said housing roll, said operable mechanism comprising a toggle unit incorporating pivotally joined shafts and links connected with and depending from said housing to carry said frame and arranged to operate in a plane common to the axes of both rolls, and adjustable eccentric mechanism connected with one of said toggle shafts and constructed and arranged to selectively vary the maximum distance of approach of said forming roll on said movable frame with respect to said forming roll on said housing, and power means connected with said toggle unit to straighten or break said toggle unit in its plane of operation.

3. A machine for deforming a peripheral portion of a tubular work piece comprising a base, a housing on said base, a movable frame carried by said housing, work forming rolls connected with said housing and movable frame, and operable mechanism interconnected between said housing and frame to suspend the movable frame from said housing and whereby to actuate the frame and its frame roll toward and away from said housing roll, said operable mechanism comprising a toggle unit incorporating pivotally joined shafts and links connected with and depending from said housing to carry said frame and arranged to operate in a plane common to the axes of both rolls, and adjustable eccentric mechanism connected with one of said toggle shafts and constructed and arranged to selectively vary the maximum distance of approach of said forming roll on said movable frame with respect to said forming roll on said housing, and power means connected with said toggle unit to straighten or break said toggle unit in its plane of operation, and power driven means connected with said work forming rolls to rotate said rolls as the latter are bodily actuated by said toggle unit.

4. A flanging machine comprising a fixed support, a movable support, shafts carried by each support and having metal forming rolls thereon, pivotal means to connect said supports adjacent one end of said roll shafts, expandible link means interposed between said supports adjacent the other end of said shafts to operatively move said shafts together and apart, and cooperative adjustable means for selectively determining the maximum and minimum shaft separations effected by said expandible link means, one of said adjustable means comprising an eccentric mounting associated with said pivotal means connecting said supports, and the other of said adjustable means comprising another eccentric mounting associated with one portion of said expandible link means.

5. In a flanging machine, the combination of a housing, a first roll carrying shaft mounted for rotation upon a fixed axis in said housing, a second roll carrying shaft, a frame to support said second shaft for rotation upon a movable axis, a pivot unit to connect said frame with said housing adjacent one location along said shafts, pivotally joined toggle links pivotally connected with said frame and housing respectively at another location adjacent the other ends of said shafts and arranged to move said second shaft toward and away from said first shaft, and adjustable means to limit the maximum and minimum spacings between said roll shafts comprising an eccentric support in said housing to carry said pivot unit, and an eccentric support associated with one of the toggle link pivots to bodily shift the axial location of the latter.

6. In a machine for deforming a peripheral portion of one end of a work piece in the form of a tube disposed with one end adjacent the machine and with means remote from the machine to support the other end of said tube, the improvement comprising fixed and movable frames, forming rolls to support the tube end adjacent the machine by radial engagement of the tube at opposite sides of the lower segmental wall portion of the open machine end of said tube whereby to position the tube upwardly from the contact area of said rolls, and spaced roll supporting bearings on each of said frames, at least one of said bearings of each frame being positioned in outboard relation ahead of said rolls, respectively, to stabilize said rolls and for supporting the adjacent tube end through said rolls, and tube orienting means connected with one of said frames comprising tube edge contacting members spaced laterally outwardly with respect to said forming rolls for engagement with circumferentially spaced points on said tube edge to hold said tube in a given longitudinal relation upon said forming rolls.

7. A machine for deforming an end portion of a work piece in the form of an open ended tube comprising a fixed frame and a movable frame, a trunnion unit to connect said frames for relative movement, forming rolls carried by each frame for engaging said tube, a second trunnion unit on said fixed frame, and a toggle link means connected with said second trunnion unit and suspended therefrom for the support of the swingable end of said movable frame, actuating means connected to operate said toggle link means to cause relative movement between said frames and the forming rolls carried thereby, and cooperative guide means on said frames respectively to cause said toggle link suspended movable frame and its roll to move in a predetermined plane of operation in relation to the fixed frame and its roll comprising spaced walls on said fixed frame presenting spaced guide surfaces, said movable frame extending between said spaced guide surfaces of the fixed frame walls, and said movable frame having opposite wall portions thereof arranged in contacting engagement with said spaced guide surfaces of said fixed frame walls, and said toggle link means consisting of a plurality of pivotally joined links sandwiched between oppositely related bearing members carried by said spaced walls of said fixed frame and by spaced portions of said movable frame respectively to prevent spreading of said links toward said walls, and sleeve units interposed between the respective links of said link means to prevent relative inward movement of said links with respect to said walls.

8. A machine for deforming an end portion of a work piece in the form of an open ended tube comprising a fixed frame and a movable frame, a trunnion unit to connect said frames for relative movement, forming rolls carried by each frame for engaging said tube, a second trunnion unit on said fixed frame, and a toggle link means connected with said second trunnion unit and suspended therefrom for the support of the swingable end of said movable frame, actuating means connected to operate said toggle link means to cause relative movement between said frames and the forming rolls carried thereby, and cooperative guide means on said frames respectively to cause said toggle link suspended movable frame and its roll to move in a predetermined plane of operation in relation to the fixed frame and its roll, and eccentric adjustment mechanisms associated with each of said trunnion units for bodily adjustment of the relative cooperative positions of said fixed and movable frames independently of the operative action of said toggle link means.

9. An offset flanger comprising a pair of opposed frames, a supporting shaft for one end of one of said frames to carry said frame for swinging movement toward and away from the other frame, a forming roller carried by each frame respectively at the end thereof opposite to the point of shaft support on said one frame, actuating structure connected with said one frame to swing said frame on its supporting shaft, and a second supporting shaft embodied in said actuating structure for said one frame, and means for varying the distance between said frames, said means comprising eccentric mounting means associated with each of said supporting shafts respectively.

10. An offset flanger comprising a pair of substantially parallel shafts, a forming roller on each shaft respectively, a main supporting frame for one of said shafts, an auxiliary frame, spaced mechanisms adapted to connect separated portions of said auxiliary frame with separated portions on said main frame and arranged to swingably support said auxiliary frame with respect to said main frame, said auxiliary frame being adapted to carry the end portions of the other of said shafts to move the associated roller on said other shaft toward and away from the roller on said main frame shaft, and structure incorporated into each of said spaced mechanisms comprising independently operable eccentric means interposed between said auxiliary frame and said main frame for selectively moving said shafts relatively to each other at either end thereof and toward and away from each other.

11. A flanging machine comprising a fixed support, a movable support, shafts carried by each support and having metal forming rolls thereon, a fulcrum shaft connecting said supports adjacent one end of said roll shafts to permit swinging movement of the free ends of said supports toward and away from each other in a given plane of operation, link mechanism interposed between and connected with the swingable ends of said supports and arranged to actuate said support ends and the shafts carried thereby toward or away from each other for manipulation of the metal forming rolls, a second fulcrum shaft provided to join one end of said link mechanism with one of said supports, and cooperative and selectively adjustable means to determine the maximum and minimum separations of the roll shafts carried by said supports under the actuation of said link mechanism, said adjustable means each comprising rotatably adjustable eccentric sleeve bearings mounted in the aforesaid supports and arranged to encircle said fulcrum shafts respectively to provide shiftable means for varying the locations of the pivotal axes of said fulcrum shafts individually and in the plane of operation of said roll shafts.

References Cited in the file of this patent

UNITED STATES PATENTS

| | | |
|---|---|---|
| 88,411 | Raymond | Mar. 30, 1869 |
| 349,355 | Packham | Sept. 21, 1886 |
| 357,228 | Pocock | Feb. 8, 1887 |
| 381,746 | Wright | Apr. 24, 1888 |
| 436,784 | Hodgson | Sept. 23, 1890 |
| 728,379 | Ditson | May 19, 1903 |
| 848,948 | White | Apr. 2, 1907 |
| 1,151,995 | Batchelder | Aug. 31, 1915 |
| 1,492,044 | Michel | Apr. 29, 1924 |
| 1,750,784 | Petersen | Mar. 18, 1930 |
| 1,774,155 | Platou | Aug. 26, 1930 |
| 2,106,866 | Best | Feb. 1, 1938 |
| 2,427,003 | Johnson | Sept. 9, 1947 |
| 2,460,123 | Cahill | Jan. 25, 1949 |
| 2,635,491 | Bell et al. | Apr. 21, 1953 |

OTHER REFERENCES

The disclosure in Iron Age for July 26, 1888 of a Beading Machine, built by the E. W. Bliss Co., page 119.